(12) United States Patent
Gutierrez et al.

(10) Patent No.: US 10,698,235 B2
(45) Date of Patent: Jun. 30, 2020

(54) OPHTHALMIC DEVICE INCLUDING LIQUID CRYSTAL ALIGNMENT FEATURES

(71) Applicant: Verily Life Sciences LLC, Mountain View, CA (US)

(72) Inventors: Christian Gutierrez, San Francisco, CA (US); Dmytro Reznikov, Santa Clara, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 193 days.

(21) Appl. No.: 15/435,167

(22) Filed: Feb. 16, 2017

(65) Prior Publication Data

US 2018/0231801 A1     Aug. 16, 2018

(51) Int. Cl.
*G02C 7/08* (2006.01)
*G02C 7/04* (2006.01)
*G02C 11/00* (2006.01)

(52) U.S. Cl.
CPC ............. *G02C 7/083* (2013.01); *G02C 7/04* (2013.01); *G02C 11/10* (2013.01); *G02C 2202/16* (2013.01); *G02C 2202/20* (2013.01)

(58) Field of Classification Search
None
See application file for complete search history.

(56) References Cited

U.S. PATENT DOCUMENTS

| | | | |
|---|---|---|---|
| 3,334,958 A * | 8/1967 | Appeldorn | F21V 5/00 359/743 |
| 5,034,166 A | 7/1991 | Rawlings et al. | |
| 5,629,056 A * | 5/1997 | Koike | G02F 1/133753 349/123 |
| 7,883,207 B2 | 2/2011 | Iyer et al. | |
| 8,079,702 B2 | 12/2011 | Ballet et al. | |

(Continued)

FOREIGN PATENT DOCUMENTS

| | | |
|---|---|---|
| CN | 105446013 A | 3/2016 |
| EP | 2 848 983 A2 | 3/2015 |

(Continued)

OTHER PUBLICATIONS

International Search Report and Written Opinion from the International Searching Authority dated Apr. 20, 2018, for International Application No. PCT/US2018/014686, filed Jan. 22, 2018, 20 pages.

(Continued)

*Primary Examiner* — Edward J Glick
*Assistant Examiner* — David Y Chung
(74) *Attorney, Agent, or Firm* — Christensen O'Connor Johnson Kindness PLLC

(57) ABSTRACT

An ophthalmic device including liquid crystal alignment features is disclosed herein. An example device may include first and second optical elements. The first optical element may include first liquid crystal alignment features formed on a first surface. The second optical element may include a first optical diffraction grating formed on a second surface, and second liquid crystal alignment features formed on the second surface. The first surface of the first optical element may face the second surface of the second optical element, and a first liquid crystal material may be disposed between the first and second surfaces of the first and second optical elements.

29 Claims, 4 Drawing Sheets

(56) References Cited

U.S. PATENT DOCUMENTS

| | | | |
|---|---|---|---|
| 8,134,782 B2 | 3/2012 | Archambeau et al. | |
| 8,542,325 B2 | 9/2013 | Burton | |
| 2005/0073739 A1* | 4/2005 | Meredith | G02B 27/017 359/319 |
| 2006/0132379 A1* | 6/2006 | Peterson | H01Q 3/46 343/910 |
| 2007/0216851 A1* | 9/2007 | Matsumoto | G02F 1/29 349/200 |
| 2008/0212007 A1 | 9/2008 | Meredith | |
| 2012/0249899 A1* | 10/2012 | Berthelot | G02B 3/08 349/13 |

FOREIGN PATENT DOCUMENTS

| | | |
|---|---|---|
| WO | 2011076604 A1 | 6/2011 |
| WO | WO 2015/105881 A1 | 7/2015 |

OTHER PUBLICATIONS

Liu, Y. et al., "Nanoimprinted Ultrafine Line and Space Nanogratings for Liquid Crystal Alignment", Nanotechnology, 23, 2012, 6 pages.

Chiou et al., "Adjustable pretilt angle of nematic 4-n-pentyl-4'-cyanobiphenyl on self-assembled monolayers formed from organosilanes on square-wave grating silica surfaces", Applied Physics Letters, Mar. 31, 2006, 3 pages.

Yu et al., "Controllable pretilt angle of liquid crystals with formation of microgrooves", IOP Science Journal of Physics D: Applied Physics, Dec. 17, 2012, 6 pages.

Choi, et al., "Hydrophobic nanopatterning on a flexible gas barrier film by using a poly(dimethylsiloxane) elastomer", IOP Science Nanotechnology, Mar. 10, 2009, 6 pages.

Chinese Office Action, with English Translation, dated Mar. 31, 2020, in corresponding Chinese Patent Application No. 201880012111.0, 23 pages.

* cited by examiner

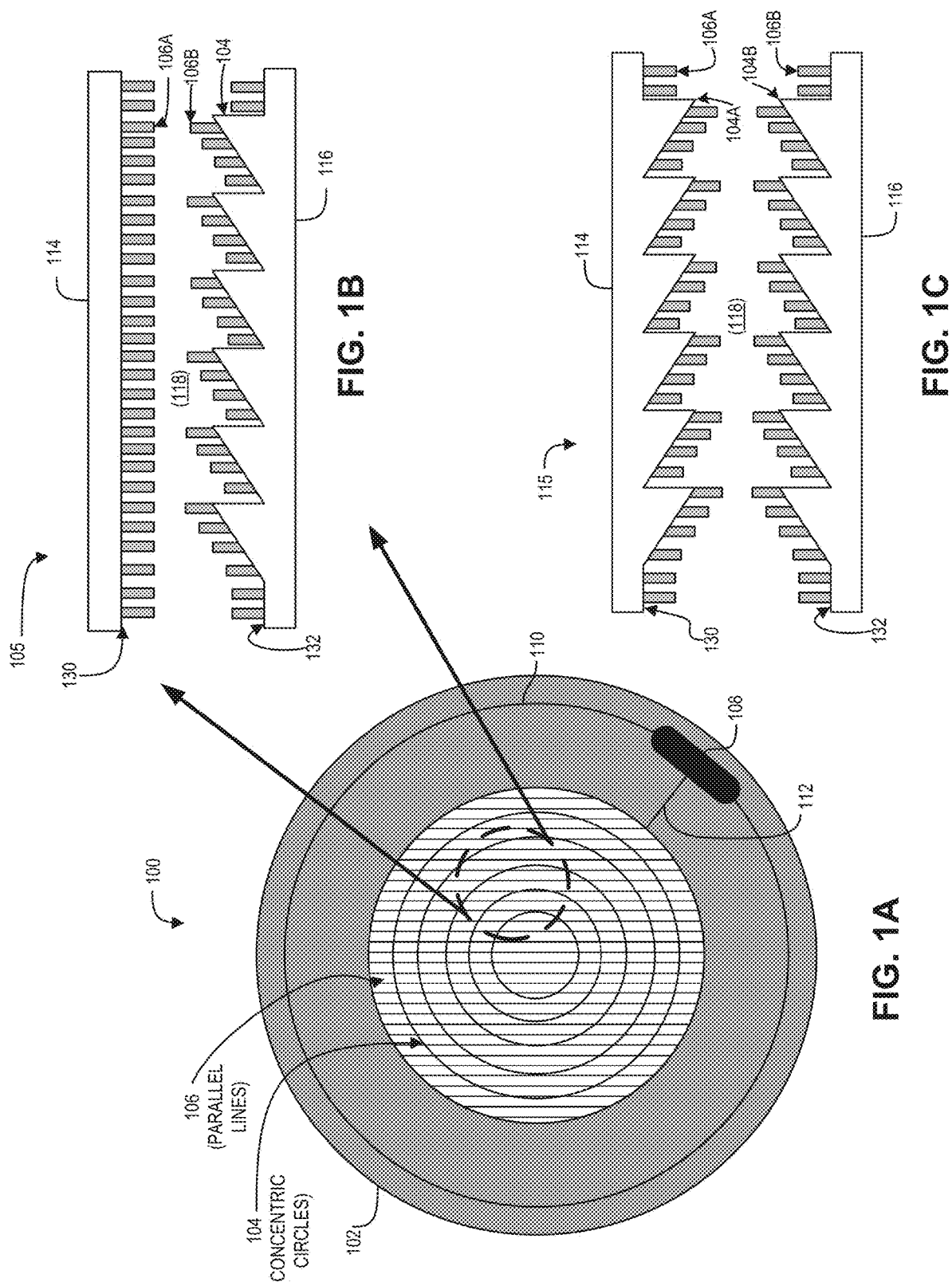

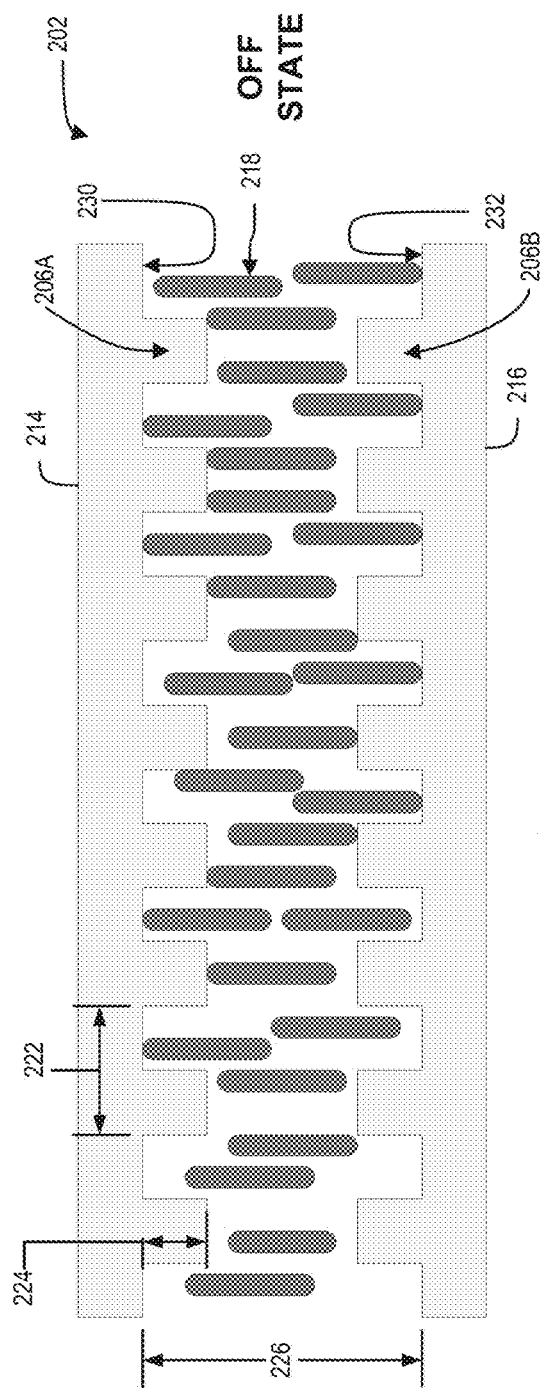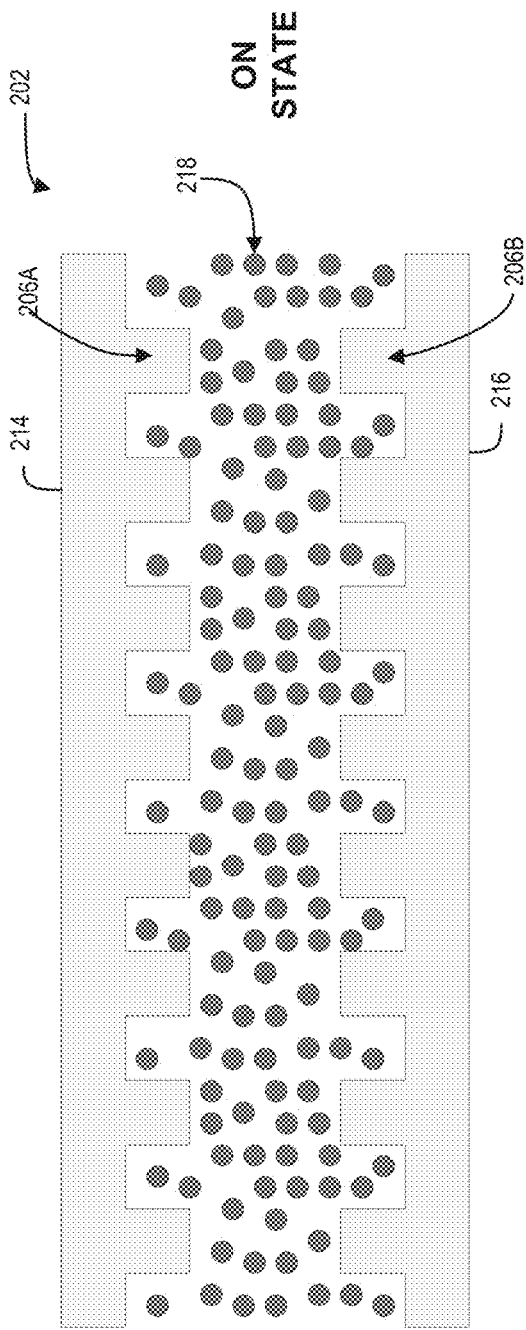
FIG. 2A
FIG. 2B

US 10,698,235 B2

OPHTHALMIC DEVICE INCLUDING LIQUID CRYSTAL ALIGNMENT FEATURES

TECHNICAL FIELD

This disclosure relates generally to ophthalmic devices, and in particular but not exclusively, relates to eye-mountable devices that include liquid crystal alignment features.

BACKGROUND INFORMATION

"Smart" ophthalmic devices have been developed to provide various advantages to a user. For example, smart ophthalmic devices, such as on-eye wearable lenses, have been developed to provide various medical sensing tasks, and to provide accommodation to the user. To provide these tasks, the ophthalmic devices include electronics and optical actuators, for example. Accommodating ophthalmic devices may use various techniques to provide the dynamic accommodation, but each may have their own advantages and disadvantages. For example, liquid crystal (LC) technology may be used, in combination with various lens elements, to provide the dynamic accommodation. In some implementations, however, ionic impurities that are conventionally associated with liquid crystal fabrication may cause power consumption concerns. Further, because a small wearable ophthalmic device may have limited power storage capacity, the switching of the liquid crystals, if performed conventionally, may be too power hungry to be reliably implemented. As such, low power liquid crystal technology may be desired.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 1A is an example plan view illustration of an ophthalmic device 100 including liquid crystal alignment features in accordance with an embodiment of the present disclosure.

FIG. 1B is an illustrative cross-section of an optical stack 105 including LC alignment features in accordance with an embodiment of the present disclosure.

FIG. 1C is an illustrative side view of an optical stack 115 in accordance with an embodiment of the present disclosure.

FIGS. 2A and 2B illustrate an ophthalmic device 200 including LC alignment features in accordance with an embodiment of the present disclosure.

DETAILED DESCRIPTION

Figure 3A:
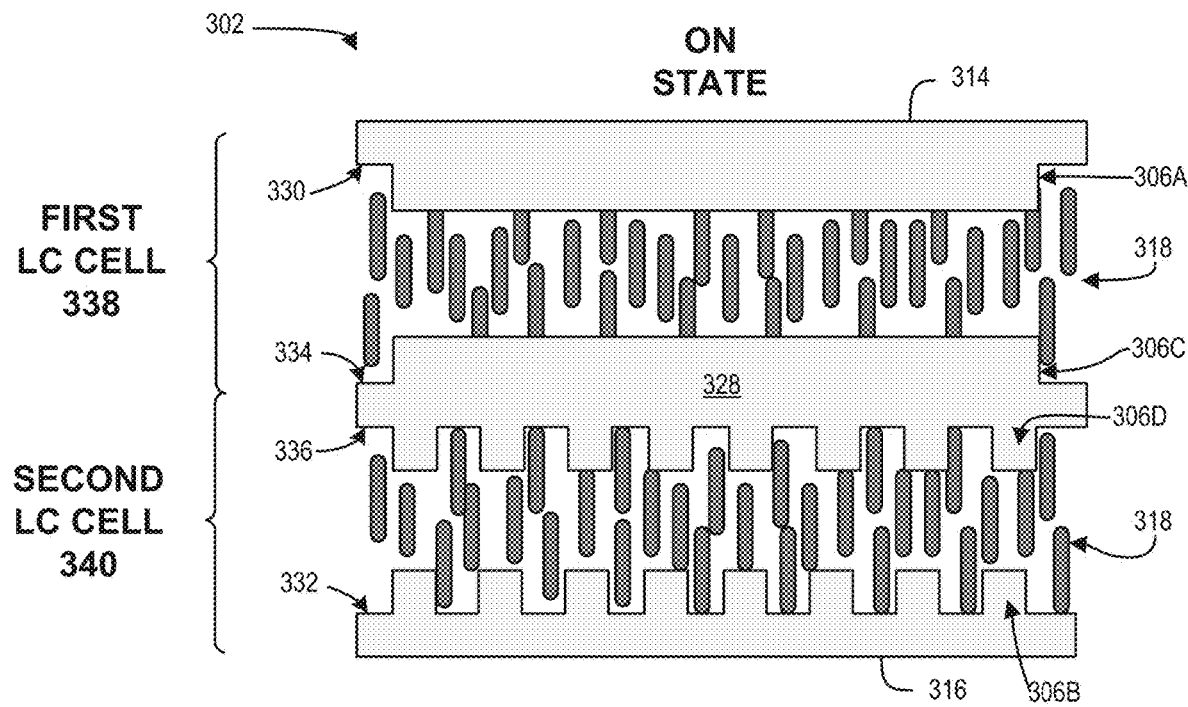
FIGS. 3A and 3B are an illustrative block diagram of an ophthalmic device 300 including LC alignment features in accordance with an embodiment of the present disclosure.

Embodiments of a system and method for an ophthalmic device including liquid crystal alignment features are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A is an example plan view illustration of an ophthalmic device 100 including liquid crystal alignment features in accordance with an embodiment of the present disclosure. The ophthalmic device 100 may be an on-eye wearable device or an implantable device, such as an intraocular lens. In some embodiments, the ophthalmic device 100 may include electronics and various interconnections to control a dynamic optic. For example, control electronics may control a dynamic optic to provide accommodation for a user. The dynamic optic may be formed from a stack of optical elements, each receiving a voltage, for example, to modulate the dynamic optic. In some embodiments, the dynamic optic may be based on liquid crystal technology, and may further include LC alignment features to influence the orientation of the LCs in a desired direction in either or both an ON and/or an OFF state.

The illustrated embodiment of the ophthalmic device 100 includes an optical stack 102, control electronics 108, an antenna 110, and a conductive trace 112. The optical stack 102 may include two, three, or more optical elements, but the number of optical elements should not be considered a limiting feature of the present disclosure. In some embodiments, the ophthalmic device 200 may further include a soft over mold disposed around the optical stack 102, control electronics 108, antenna 110 and conductive trace 112. The soft over mold, which may also be referred to as an encasement, may be formed from soft, flexible biocompatible materials, such as polymeric material like polymethyl methacrylate ("PMMA"), polyhydroxyethylmethacrylate ("polyHEMA"), a hydrogel, silicon based polymers (e.g., flour-silicon acrylate) combinations of these or otherwise. In some embodiments, the soft over mold may provide a surface for intimate contact with a user's cornea, for example.

The illustrated embodiment of the optical stack 102 include two, three, or more optical elements with each of the optical elements potentially including an optical diffraction grating 104, and LC alignment features 106. Disposed between each optical element of the optical stack 102 may be a layer of LC material (see FIG. 1B, for example). In some embodiments, the optical stack 102 may take the shape of a hemispherical shell, and may have a posterior side, e.g., eye-facing side, that is concave, and an anterior side, e.g., external facing side, that is convex. The shape of the optical stack 102 may also inform the shape of the individual optical elements forming the optical stack 102. The concave side, in some embodiments, may have a radius of curvature commensurate with a radius of curvature of a user's cornea. Further, the individual optical elements of the optical stack 102 may be formed from one or more rigid or semi-rigid biocompatible materials amendable to being worn on an eye or implanted into an eye. For example, the individual optical elements of the optical stack 102 may be formed from one or more of polyurethane, acrylic (PMMA), polyimide, silicon-based polymers, silicone acrylate, rigid gas permeable fluorosilicone acrylate, and the like.

In embodiments that only include two optical elements, such as shown in FIGS. 1B, 1C, 2A and 2B, the ophthalmic device 100 may include one or more polarizers. For example, a polarizer may be placed on both the anterior and posterior sides of the ophthalmic device 100. The polarizers may be needed to fully provide accommodation to the user by orienting the light propagating through the ophthalmic device 100 to be affected by one or more optical diffraction gratings 104.

The illustrated embodiment of the ophthalmic device 100 may have an optical area encompassing a central diameter and centered on an optical axis of the optical stack 102. The optical area may be 4 to 6 mm in diameter and is indicated by the white area in the center of the optical stack 102. The ophthalmic device 100 may further have an outer or peripheral area encompassing the optical area. The peripheral area may extend from the outer diameter of the optical area to a diameter of 10 to 15 mm. In FIG. 1, the peripheral area is indicated by the grey area of the optical stack 102. As worn on an eye, the optical area may align with a user's cornea and the user's vision, while the peripheral area may be outside of the user's vision.

The optical diffraction grating 104 may be physical features formed in or on one more optical elements of the optical stack 102. For example, the optical diffraction grating 104 may be formed on an internal facing surface of at least one optical element of the optical stack 102. In some embodiments, the optical diffraction grating 104 may be formed from the same material as used to form the optical stack 102. For example, the optical diffraction grating 104 may be included in a mold used to from at least one of the optical elements of the optical stack 102. The optical diffraction grating 104 may be formed from micron-sized features that may take the shape of saw tooth, step, and/or triangular structures. In some embodiments, the micron-sized structures may be repetitive concentric structures centered on the optical axis of the optical stack 102. In combination with LC material, the optical diffraction grating 104 may provide dynamic refractive properties to the ophthalmic device 100. In some embodiments, the optical stack 102 may have static optical power.

The LC alignment features 106 may be nanometer-scale parallel grooves and ridges formed in or on one or more surfaces of the optical elements forming the optical stack 102. The nanometer-scale grooves/ridges may extend across at least the optical area of the optical stack 102. The LC alignment features 106 may provide alignment inducing structure to liquid crystals in an LC material. As used herein, liquid crystals may refer to liquid crystal molecules. The LC alignment features, for example, may alter the surface energy of the optical elements for the optical stack 102. The altered surface energy may cause the liquid crystals to preferentially align in a vertical or horizontal position (with respect to the optical elements of the optical stack 102) in an ON and an OFF state of the ophthalmic device 100. The preferential orientation of the liquid crystals may provide uniform alignment of the liquid crystals at least in the area where the LC alignment features 106 are disposed, and the uniform alignment may provide uniform ON and OFF state operation of the ophthalmic device 100.

Control electronics 108 may be coupled to choreograph the operation of a dynamic optic formed by the optical stack 102 in combination with the LC material, and the transparent conductors. In some embodiments, the control electronics 108 may be disposed on an annular-shaped substrate that is incorporated into the optical stack 102 and that encompasses at the least the optical area. The control electronics 108 may provide a voltage to one or more of transparent conductors included in the optical stack 102 to establish a potential difference across two or more optical elements of the optical stack 102. The potential difference may cause the liquid crystals in the LC material to rotate about an axis by around 90 degrees, for example. The change in orientation of the liquid crystals may change the index of refraction of the liquid crystal material. As such, there may be a change in index of refraction between the optical elements of the optical stack 102 and the LC material, which may allow the optical diffraction gratings 104 to be activated, e.g., to become visible to the user. The activation of the optical diffraction grating 104 may provide additional optical power to the user, which may additional provide accommodation to the user.

FIG. 1B is an illustrative cross-section of an optical stack 105 including LC alignment features in accordance with an embodiment of the present disclosure. The optical stack 105 may be an example of the optical stack 102. The illustrative side view of the optical stack 105 may show an area from within the optical area of the ophthalmic device 100. The illustrative embodiment of the optical stack 105 includes first and second optical elements 114 and 116, optical diffraction grating 104, LC alignment features 106, and LC material 118.

The first optical element 114 may include LC alignment features 106A. The LC alignment features 106A may be formed in or on a surface 130 of the first optical element 114. In some embodiments, the surface 130 may be a concave surface of the first optical element 114, and the surface on the opposite side of the first optical element 114 may be a convex surface. Of course, the opposite orientations may also be covered by the present disclosure. The LC alignment features 106A may include grooves and ridges having a square wave cross-section that extend at least across an optical area of the first optical element 114.

The first optical element 114 may be injected molded, for example. In some embodiments, the LC alignment features 106A may be included in the mold so that they are formed in the first optical element 114. The first optical element 114, as noted above, may be formed from polyurethane, PMMA, polyimide, silicon-based polymers, and the like. In some embodiments, the first optical element 114 may be rigid or semi-rigid, and may further be formed from a gas permeable material.

The second optical element 116 may include the optical diffraction grating 104 and LC alignment features 106B. Both the optical diffraction grating 104 and the LC alignment features 106B may be formed in or on a surface 132 of the second optical element 116. In some embodiments, the surface 132 may be a convex surface of the second optical element 116, and the surface on the opposite side of the first optical element 116 may be a concave surface. Of course, the opposite orientations may also be covered by the present disclosure.

The optical diffraction grating 104 may be formed in or on a surface 132 of the second optical element 116, and include repeating structures as shown in FIG. 1B, such as a saw tooth-like structure. However, other structure types may alternatively be used for the optical diffraction grating 104, such as step-like structures and/or triangular-like structures. Further, the structures of the optical diffraction grating 104 may be formed as concentric circles centered on an optical axis of the optical stack 105. The optical diffraction grating 104 may provide optical power to the second optical element 116, and ultimately to the optical stack 105. The optical power may be dynamic in that it may be enabled/disabled due to manipulation of the LC material 118, for example. In some embodiments, the manipulation of the LC material 118 may provide accommodation for a user. However, in order to provide the desired accommodation, the size of the optical diffraction grating 104 may be selected to affect wavelengths in the visible portion of the spectrum. As such, the optical diffraction grating 104 may be on the order of visible wavelengths. For example, the structures forming the optical diffraction grating 104 may be from 1 to 100 microns.

Additionally, LC alignment features 106B may be formed in or on the optical diffraction grating 104. The LC alignment features may be nano-scaled features that promote a desired alignment orientation of liquid crystals in the LC material 118 in an off state and an on state. For example, the desired alignment orientation may be homeotropic or homogeneous. The LC alignment features 106B may have a square-wave cross section and form parallel grooves/ridges that extend across at least the optical area of the optical stack 105. The parallel grooves/ridges may extend across the optical diffraction grating 104 regardless of the relative orientation of the parallel grooves and the optical diffraction grating 104. Similar to the first optical elements 114, the second optical element 116 may be injected molded, for example. In some embodiments, the optical diffraction grating 104 and the LC alignment features 106B may be included in the mold so that they are formed in the second optical element 116. In general, the second optical element 116 may be formed from like materials as is used to form the first optical element 114.

The first and second optical elements 114 and 116 may be formed into the optical stack 105 with the LC material 118 disposed between the two optical elements 114, 116. The surfaces 130 and 132 of the first and second optical elements 114 and 116, respectively, may oppose one another so that the LC alignment features 106A and 106B of the first and second optical elements 114 and 116 are facing. In some embodiments, individual LC alignment features 106A, B on the first and second optical elements 114 and 116 may align.

In some embodiments, the optical stack 105 may have the form of a hemispherical shell with a concave side of the first optical element 114 facing a convex side of the second optical element 116, for example. The first and second optical elements 114 and 116 may nest into each other, as such, with the LC material 118 forms a thin layer between the two optical elements 114 and 116. For example, the thickness of the LC material 118 may be from 1 to 50 microns, or more. In such an orientation, the surfaces 130 and 132 may be referred to as internal-facing surfaces of the optical stack 105.

While not shown, the first and second optical elements 114 and 116 may additionally include transparent or semi-transparent conductors disposed thereon. For example, the transparent or semi-transparent conductors may be disposed on facing surfaces of the optical stack 105, such as surfaces 130 and 132. Alternatively, the transparent or semi-transparent conductors may be disposed on the outside surfaces of the first and second optical elements 114 and 116, such as the surfaces that do not include the LC alignment features 106A, B and the optical diffraction grating 104. The (semi)transparent conductors may be coupled to control electronics via a conductive trace, see FIG. 1A, so that a potential difference may be generated across the LC material 118 in response to charge being provided to the (semi)transparent conductors.

The first and second optical elements 114 and 116 may be formed from similar biocompatible, transparent materials. The material or materials used to form the first and second optical elements 114 and 116 may have a characteristic index of refraction. Additionally, the LC material 118 may have an index of refraction in an off state similar to the index of refraction of the material or materials used to form the first and second optical elements 114 and 116. Accordingly, with the index of refraction through the optical stack 105 including the LC material 118 being similar, the optical diffraction grating 104 may not affect light propagating through the optical stack 105. However, in an on state, the liquid crystals in the LC material 118 may change orientation to alter the index of refraction of the LC material 118. With an altered index of refraction for the LC material 118, the optical diffraction grating 104 may affect light propagating through the optical stack 105. In some embodiments, the effect to the propagating light may be to increase optical power, which may provide accommodation to a user of the ophthalmic device 100.

FIG. 1C is an illustrative side view of an optical stack 115 in accordance with an embodiment of the present disclosure. The optical stack 115 may be an example of the optical stack 102. The illustrative side view of the optical stack 115 may show an area from within the optical area of the ophthalmic device 100. The illustrative embodiment of the optical stack 115 includes first and second optical elements 114 and 116, optical diffraction gratings 104, LC alignment features 106, and LC material 118. The Optical stack 115 is substantially similar to the optical stack 105 except for the additional optical diffraction grating 104B included on the first optical element 114. The optical stack 115 includes the optical diffraction gratings 104B, A on the first and second optical elements 114 and 116 to provide additional optical power to the dynamic optics of the ophthalmic device 100.

FIGS. 2A and 2B illustrate an optical stack 202 including LC alignment features in accordance with an embodiment of the present disclosure. FIG. 2A further illustrates an orientation of liquid crystals when the ophthalmic device 200 is in an OFF state, whereas FIG. 2B illustrates the orientation of the liquid crystals when the ophthalmic device 200 is in an ON state. The optical stack 202 may be an example of the optical stack 102. As above, the ON state refers to the orientation of the liquid crystals when a potential difference is established across the LC material 218, and the OFF state refers to the absence of the potential difference. For example, for homeotropic alignment, as shown, the liquid crystals may orient vertically in the absence of an applied potential, e.g., the OFF state, but may orient horizontally in the presence of an applied potential, e.g., the ON state.

The illustrated embodiment of the optical stack 202 includes first and second optical elements 214 and 216, and liquid crystal alignment features 218. Other features of the optical stack 202 and an ophthalmic device, such as the ophthalmic device 100, have been omitted for clarity of discussion, but should also be considered included. For example, optical diffraction gratings, control electronics, (semi)transparent conductors, and an over mold have been omitted so not to clutter FIGS. 2A and 2B. As used herein, the optical stack 202 may alternatively be referred to as a "LC cell."

The first optical element 214 may include the LC alignment features 206A formed in or on a surface 230 of the first optical element 214. The LC alignment features 206A may include a plurality of parallel grooves/ridges that extend across the surface 230. In some embodiments, the LC alignment features 206A may only extend across an optical area of the optical stack 202. In some embodiments, the LC alignment features 206A may extend across the entirety of the optical stack 202, such as the optical area and the peripheral area. The grooves/ridges of the LC alignment features 206A may have a pitch 222 and a depth 224. For example, the pitch 222 may range from 50 nanometers to 1000, and the depth 224 may range from 20 to 500 nanometers. In some embodiments, the pitch 222 and the depth 224 may affect the surface energy of the surfaces 230 and 232 at least with respect to liquid crystals in the LC material 218, for example.

The second optical element 216 may additionally include LC alignment features 206B formed on a surface 232 of the second optical element 216. The LC alignment features 206B included with the second optical element 216 may be similar to the LC alignment features of the first optical element 214. For example, the LC alignment features 206B may have similar pitch and depth as the LC alignment features 206A.

Disposed between the first and second optical elements 214 and 216 is the LC material 218. FIG. 2A depicts individual liquid crystals of the LC material 218 oriented perpendicular to the first and second optical elements 214 and 216. This orientation represents the OFF state for homeotropic alignment. The orientation of the liquid crystals may be influenced by the LC alignment features 206A, B. Without the LC alignment features 206A, B, the liquid crystals may align in random orientations, which may not be desired. The LC alignment features 206A, B however, may change the surface energy of the surfaces 230 and/or 232 so that vertical alignment is preferred in the OFF state. The change in surface energy may include changing a degree of hydrophobicity of the surfaces 230 and 232, for example.

Referring to FIG. 2A, the LC alignment features 206A, B of the first and second optical elements 214 and 216 are extending into and out of the page. As noted, the optical stack 202 of FIG. 2A is in the OFF state. As such, the liquid crystals of the LC material 218 may preferentially be vertically aligned due to the LC alignment features 206A, B providing a desired surface energy to preferentially orient the liquid crystals as shown. The preferential alignment may be varied from normal to the first and second optical elements 214 and 216 to various degrees off normal, such as one to five degree off normal, for example. The one or five degrees off of normal may be referred to as pre-tilt. In some embodiments, a desired amount of pre-tilt may be obtained due to changing the degree of hydrophobicity of the surfaces 230 and 232, which may be based on changes in pitch 222 and/or depth 224 of the LC alignment features 206. Additional adjustments to the degree of hydrophobicity may be obtained through thin depositions of silane, such as a two-component mixture of silane for example. Additionally, in the OFF state, the index of refraction of the LC material 218 may be similar to or equal to the index of refraction of the first and second optical elements 214 and 216. As a result, any optical diffraction grating included with the first and/or second optical elements 214 and 216 may not affect light propagating through the optical stack 202.

Referring to FIG. 2B, the ON state is shown, which may be the result of establishing a potential difference across the LC material 218 by providing a voltage to (semi)transparent electrodes (not shown) disposed on the first and second optical elements 214 and 216. The potential difference may promote a rotational force to the liquid crystals that causes them to align substantially parallel to the LC alignment features 206A, B. In the ON state, as noted, the index of refraction of the LC material may change. The change in index of refraction, especially with respect to the index of refraction of the first and second optical elements 214 and 216, may allow any optical diffraction grating included with the first and/or second optical elements 214 and 216 to affect light propagating through the optical stack 202. For example, optical diffraction gratings included with the first and/or second optical elements 214 and 216 may provide positive optical power to the optical stack 202, which may provide accommodation to a user.

Figure 3B:
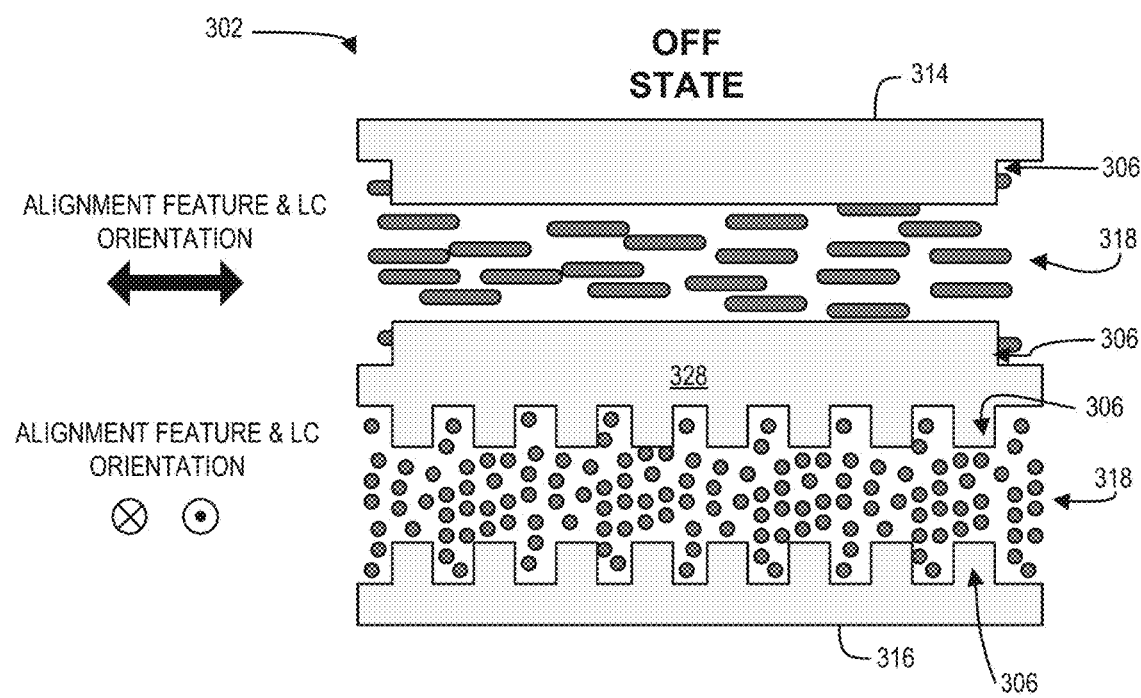

FIGS. 3A and 3B are an illustrative block diagram of an optical stack 302 including LC alignment features in accordance with an embodiment of the present disclosure. Specifically, FIG. 3A shows the ophthalmic device 300 in an on state, while FIG. 3B shows the ophthalmic device 300 in an off state. The illustrated embodiment of the optical stack 302, which may be an example of the optical stack 102, includes three optical elements—first optical element 314, second optical element 316, and third optical element 328—LC alignment features 306, and LC material 318. While optical diffraction gratings are not shown in FIG. 3A or 3B, the first, second and third optical elements 314, 316 and 328, may all have optical diffraction gratings formed on one or more of their respective surfaces.

The first optical element 314 may include LC alignment features 306A formed in or on a surface 330. The LC alignment features 306A may include a plurality of parallel grooves/ridges that extend across the surface 330. As shown in FIG. 3A, the grooves/ridges may extend in plane with the page. The second optical element 316 may include LC alignment features 306B formed in or on a surface 332. As shown in FIG. 3A, the LC alignment features 306B of the second optical element 316 extend across the surface 332 in an out of the plane of the page.

The third optical element 306 may include LC alignment features 306C and 306D on both a surface 334 and an opposite surface 336, respectively. The LC alignment features 306C on the surface 334 may extend in plane with the page, similar to and parallel to the LC alignment features 306A of the first optical element 314. The LC alignment features 306D, however, on the surface 336 may extend in and out of the plane of the page, similar to and parallel to the LC alignment features 306B of the second optical element 316.

To form the optical stack 302, the first optical element 314 may be aligned to the surface 334 side of the third optical element 328. A layer of LC material 318 may be disposed between the first and third optical elements 314 and 328. A combination of the first optical element 314, the LC material 318, and the surface 334 side of the third optical element 328 may form a first LC cell 338. Additionally, the second optical element 316 may be aligned to the surface 336 side of the third optical element 328, and a layer of LC material 318 may be disposed between the second and third optical elements 316 and 328. A combination of the second optical element 314, the LC material 318, and the surface 336 side of the third optical element 328 may form a second LC cell 340. The LC alignment features 306A and 306C on the surfaces 330 and 334 of the first and third optical elements 314 and 328, respectively, may extend parallel to one another. Likewise, the LC alignment features 306D and 306B on the surfaces 332 and 336 of the second and third optical elements 314 and 328, respectively, may extend parallel to one another. As such, the LC alignment features 306 of the first cell 338 may be perpendicular to the LC alignment features of the second cell 340.

Referring to FIG. 3A, to produce the ON state, voltages applied to (semi)transparent conductors disposed on the first, second and third optical elements 314, 316 and 328 may establish a potential difference across the first and/or second LC cells 338 and 340. The potential differences may induce a rotation of the liquid crystals in the LC materials 318 in both first and second LC cells 338 and 340, for example. The rotation of the liquid crystals may alter the index of refraction of the LC materials 318 (as noted), which may cause one or more optical diffraction gratings included in the optical stack 300 to interact with light propagating through the optical stack 300. The orientation of the liquid crystals as shown in FIG. 3A is for homogenous alignment. As such, in the on state, the liquid crystals may orient normal to the first, second and third optical elements 314, 316, and 328 in the on state.

Referring to FIG. 3B, the absence of the potential difference across the first and second LC cells 338 and 340, or the removal of the potential differences from the first and second LC cells 338 and 340, may cause the liquid crystals in the LC materials 318 to revert back to the un-rotated orientation, such as in plane with or parallel to the LC alignment features 306 of the first, second, and third optical elements 314, 316, and 328. As shown in FIG. 3B, the liquid crystals in the LC cell 338 may be aligned in plane with the page, and the liquid crystals in the LC cell 340 may be aligned in and out of the page, when in the off state.

Figure 4:
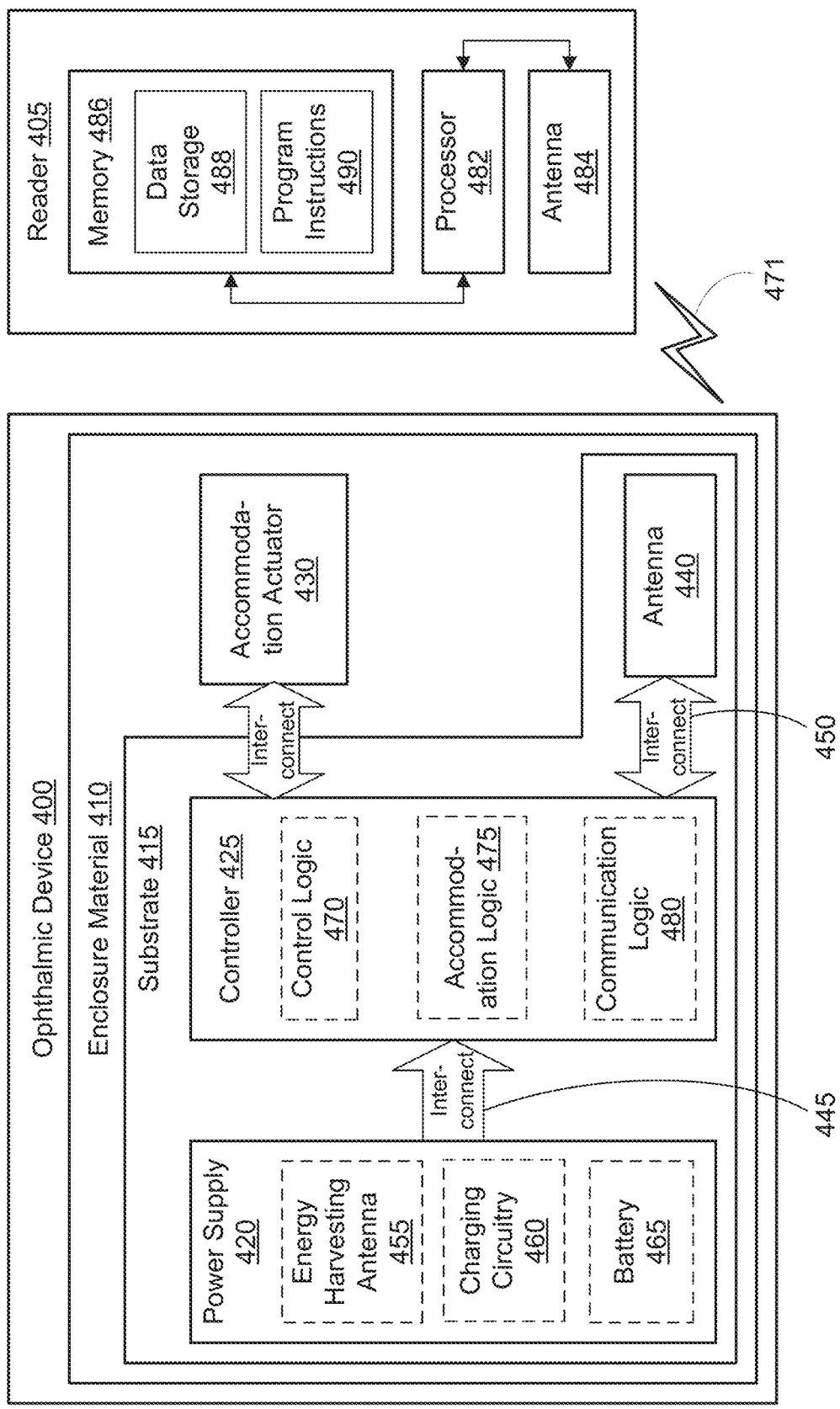
FIG. 4 is a functional block diagram of an ophthalmic device 400 including liquid crystal alignment features in accordance with an embodiment of the present disclosure.

FIG. 4 is a functional block diagram of an ophthalmic device 400 including liquid crystal alignment features in accordance with an embodiment of the present disclosure. Ophthalmic device 400 may be an on-eye device, such as a contact lens or a smart contact lens, or an implantable device, such as an intraocular lens. In the depicted embodiment, ophthalmic device 400 includes an enclosure material 410 formed to be either contact-mounted to a corneal surface of an eye or implanted into an eye. A substrate 415 is embedded within or surrounded by enclosure material 410 to provide a mounting surface for a power supply 420, a controller 425, an antenna 440, and various interconnects 445 and 450. The substrate 415 and the associated electronics may be one implementation of the control electronics 108 and an associated substrate. The illustrated embodiment of power supply 420 includes an energy harvesting antenna 455, charging circuitry 460, and a battery 465. The illustrated embodiment of controller 425 includes control logic 470, accommodation logic 475, and communication logic 480. As shown, accommodation actuator 430 is disposed in the enclosure material 410.

Power supply 420 supplies operating voltages to the controller 425 and/or the accommodation actuator 430. Antenna 440 is operated by the controller 425 to communicate information to and/or from ophthalmic device 400. In the illustrated embodiment, antenna 440, controller 425, and power supply 420 are disposed on/in substrate 415, while accommodation actuator 430 is disposed in enclosure material 410 (not in/on substrate 415). However, in other embodiments, the various pieces of circuitry and devices contained in ophthalmic device 400 may be disposed in/on substrate 415 or in enclosure material 410, depending on the specific design of ophthalmic device 400. For example, in one embodiment, accommodation actuator 430 may be disposed on one or more transparent substrates, such as the optical stack 102, 105, 115, 202, and/or 302.

Substrate 415 includes one or more surfaces suitable for mounting controller 425, power supply 420, and antenna 440. Substrate 415 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or silver nanowire mesh) can be patterned on substrate 415 to form circuitry, electrodes, etc. For example, antenna 440 can be formed by depositing a pattern of gold or another conductive material on substrate 415. Similarly, interconnects 445 and 450 can be formed by depositing suitable patterns of conductive materials on substrate 415. A combination of resists, masks, and deposition techniques can be employed to pattern materials on substrate 415. Substrate 415 can be a relatively rigid material, such as polyethylene terephthalate ("PET") or another material sufficient to structurally support the circuitry and/or electronics within enclosure material 410. Ophthalmic device 400 can alternatively be arranged with a group of unconnected substrates rather than a single substrate 415. For example, controller 425 and power supply 420 can be mounted to one substrate 415, while antenna 440 is mounted to another substrate 415 and the two can be electrically connected via interconnects. Substrate 415 may also be a continuous piece of semiconductor, housing all or some of the aforementioned pieces of device architecture as integrated circuitry.

Substrate 415 can be shaped as a flattened ring with a radial width dimension sufficient to provide a mounting platform for the embedded electronic components. Substrate 415 can have a thickness sufficiently small to allow substrate 415 to be embedded in enclosure material 410 without adversely influencing the profile of ophthalmic device 400. Substrate 415 can have a thickness sufficiently large to provide structural stability suitable for supporting the electronics mounted thereon. For example, substrate 415 can be shaped as a ring with a diameter of about 10 millimeters, a radial width of about 1 millimeter (e.g., an outer radius 1 millimeter larger than an inner radius), and a thickness of about 50 micrometers. In some embodiments, the substrate 415 may encircle at least the optical area of an associated optical stack, and may be disposed at least between one or more optical elements of the associated optical stack. For example, the substrate 415 may be disposed in a peripheral area of the optical stack 102 and in between at least two optical elements, such as optical elements 114 and 116, of the optical stack. Substrate 415 can optionally be aligned with the curvature of the eye-mounting surface of ophthalmic device 400 (e.g., convex surface). For example, substrate 415 can be shaped along the surface of an imaginary cone between two circular segments that define an inner radius and an outer radius. In such an example, the surface of substrate 415 along the surface of the imaginary cone defines an inclined surface that is approximately aligned with the curvature of the eye mounting surface at that radius.

In the illustrated embodiment, power supply 420 includes a battery 465 to power the various embedded electronics, including controller 425. Battery 465 may be inductively charged by charging circuitry 460 and energy harvesting antenna 455. In one embodiment, antenna 440 and energy harvesting antenna 455 are independent antennae, which serve their respective functions of energy harvesting and communications. In another embodiment, energy harvesting antenna 455 and antenna 440 are the same physical antenna that are time shared for their respective functions of inductive charging and wireless communications with reader 405.

Additionally or alternatively, power supply 420 may include a solar cell ("photovoltaic cell") to capture energy from incoming ultraviolet, visible, and/or infrared radiation. Furthermore, an inertial power scavenging system can be included to capture energy from ambient vibrations.

Charging circuitry 460 may include a rectifier/regulator to condition the captured energy for charging battery 465 or directly power controller 425 without battery 465. Charging circuitry 460 may also include one or more energy storage devices to mitigate high frequency variations in energy harvesting antenna 455. For example, one or more energy storage devices (e.g., a capacitor, an inductor, etc.) can be connected to function as a low-pass filter.

Controller 425 contains logic to choreograph the operation of the other embedded components. Control logic 470 controls the general operation of ophthalmic device 400, including providing a logical user interface, power control functionality, etc. Accommodation logic 475 includes logic for receiving signals from sensors monitoring the orientation of the eye, determining the current gaze direction or focal distance of the user, and manipulating accommodation actuator 430 (focal distance of the contact lens) in response to these physical cues. The auto-accommodation can be implemented in real-time based upon feedback from gaze tracking, or permit the user to select specific accommodation regimes (e.g., near-field accommodation for reading, far-field accommodation for regular activities, etc.). Communication logic 480 provides communication protocols for wireless communication with reader 405 via antenna 440. In one embodiment, communication logic 480 provides backscatter communication via antenna 440 when in the presence of an electromagnetic field 471 output from reader 405. In one embodiment, communication logic 480 operates as a smart wireless radio-frequency identification ("RFID") tag that modulates the impedance of antenna 440 for backscatter wireless communications. The various logic modules of controller 425 may be implemented in software/firmware executed on a general purpose microprocessor, in hardware (e.g., application specific integrated circuit), or a combination of both.

Ophthalmic device 400 may include various other embedded electronics and logic modules. For example, a light source or pixel array may be included to provide visible feedback to the user. An accelerometer or gyroscope may be included to provide positional, rotational, directional or acceleration feedback information to controller 425.

The illustrated embodiment also includes reader 405 with a processor 482, an antenna 484, and memory 486. Memory 486 in reader 405 includes data storage 488 and program instructions 490. As shown reader 405 may be disposed outside of ophthalmic device 400, but may be placed in its proximity to charge ophthalmic device 400, send instructions to ophthalmic device 400, and/or extract data from ophthalmic device 400. In one embodiment, reader 405 may resemble a conventional contact lens holder that the user places ophthalmic device 400 in at night to charge, extract data, clean the lens, etc.

External reader 405 includes an antenna 484 (or group of more than one antennae) to send and receive wireless signals 471 to and from ophthalmic device 400. External reader 405 also includes a computing system with a processor 482 in communication with a memory 486. Memory 486 is a non-transitory computer-readable medium that can include, without limitation, magnetic disks, optical disks, organic memory, and/or any other volatile (e.g., RAM) or non-volatile (e.g., ROM) storage system readable by the processor 182. Memory 486 can include a data storage 488 to store indications of data, such as data logs (e.g., user logs), program settings (e.g., to adjust behavior of ophthalmic device 400 and/or external reader 405), etc. Memory 486 can also include program instructions 490 for execution by processor 482 to cause the external reader 405 to perform processes specified by the instructions 490. For example, program instructions 490 can cause external reader 405 to provide a user interface that allows for retrieving information communicated from ophthalmic device 400 or allows transmitting information to ophthalmic device 400 to program or otherwise select operational modes of ophthalmic device 400. External reader 105 can also include one or more hardware components for operating antenna 484 to send and receive wireless signals 471 to and from ophthalmic device 400.

External reader 405 can be a smart phone, digital assistant, or other portable computing device with wireless connectivity sufficient to provide the wireless communication link 471. External reader 405 can also be implemented as an antenna module that can be plugged into a portable computing device, such as in an embodiment where the communication link 471 operates at carrier frequencies not commonly employed in portable computing devices. In some instances, external reader 405 is a special-purpose device configured to be worn relatively near a wearer's eye to allow the wireless communication link 471 to operate with a low power budget. For example, the external reader 405 can be integrated in a piece of jewelry such as a necklace, earring, etc. or integrated in an article of clothing worn near the head, such as a hat, headband, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An ophthalmic device, comprising:
a first optical element including first liquid crystal alignment features formed on a first surface of the first optical element;
a second optical element including:
a first optical diffraction grating formed on a second surface of the second optical element, and
second liquid crystal alignment features formed on the second surface of the second optical element,
wherein the first surface of the first optical element faces the second surface of the second optical element; and
a first liquid crystal material disposed between the first and second surfaces of the first and second optical elements,
wherein the first and second surfaces are first and second curved surfaces, respectively, that are concave or convex shaped such that the first and second optical elements nest into each other, and wherein the first optical diffraction grating is formed along the second curved surface of the second optical element, wherein the first optical diffraction grating is formed from concentric rings of diffraction elements disposed around the second curved surface and wherein the second liquid crystal alignment features form parallel straight lines that cross the concentric rings of the diffraction elements.

2. The ophthalmic device of claim 1, wherein the first optical element further includes a second optical diffraction grating formed on the first surface, and wherein the first liquid crystal alignment features are disposed on the second optical diffraction grating.

3. The ophthalmic device of claim 1, wherein both the first and second liquid crystal alignment features include a plurality of parallel grooves extending across at least an optical area of the ophthalmic device, and wherein the plurality of parallel grooves forming the first and second liquid crystal alignment features are oriented in a same direction, wherein each of the plurality of parallel grooves has a square wave cross-sectional shape, and wherein the plurality of parallel grooves corresponding to the second liquid crystal alignment features form the parallel straight lines that cross the concentric rings of the diffraction elements.

4. The ophthalmic device of claim 3, wherein the plurality of parallel grooves is characterized by a pitch such that laterally adjacent grooves included in the plurality of parallel grooves are uniformly separated from one another by the pitch, and wherein the plurality of parallel groves are further characterized by a depth such that each one of the plurality of parallel grooves has a common height corresponding to the depth.

5. The ophthalmic device of claim 4, wherein the pitch ranges from 50 to 1000 nanometers, and wherein the depth ranges from 20 to 500 nanometers.

6. The ophthalmic device of claim 1, wherein the diffractive elements are saw tooth-like structures having micron-scale feature sizes.

7. The ophthalmic device of claim 1, further comprising:
a third optical element disposed between the first and second optical elements,
wherein the third optical element includes third and fourth liquid crystal alignment features formed on third and fourth surfaces of the third optical element, respectively,
wherein the third surface faces the first surface of the first optical element,
wherein the fourth surface faces the second surface of the second optical element,
wherein the second liquid crystal alignment features are aligned with the fourth liquid crystal alignment features such that each alignment feature included in the second liquid crystal alignment features overlaps with a corresponding adjacent alignment feature included in the fourth liquid crystal alignment features, and
wherein the first and the third liquid crystal alignment features are both oriented orthogonal to the second and fourth liquid crystal alignment features.

8. The ophthalmic device of claim 7, wherein the first liquid crystal material is disposed between the first surface of the first optical element and the third surface of the third optical element, wherein the ophthalmic device further comprises a second liquid crystal material disposed between the fourth surface of the third optical element and the second surface of the second optical element, and wherein in an absence of an applied potential difference across the first liquid crystal material and the second liquid crystal material, liquid crystals included in the first liquid crystal material are oriented orthogonal to liquid crystals included the second liquid crystal material.

9. The ophthalmic device of claim 1, further comprising:
control electronics disposed on a peripheral area of either the first or second optical element, and further coupled to electrodes disposed on the first and second optical elements, the control electronics coupled to change an orientation of liquid crystals contained in the first liquid crystal material, wherein the electrodes are transparent or semi-transparent.

10. The ophthalmic device of claim 1, wherein the first and second optical element are formed from semi-rigid material.

11. The ophthalmic device of claim 10, wherein the semi-rigid material may be one or more of polyurethane, acrylic, silicone acrylate, rigid gas permeable fluorosilicone acrylate, polyimide, and silicon-based polymer.

12. The ophthalmic device of claim 1, wherein the first and second optical elements are hemispherical shell shaped having a concave side and a convex side, and wherein the concave side has a radius of curvature approximate to a radius of curvature of an eye's cornea.

13. The ophthalmic device of claim 1, further comprising:
a third optical element disposed adjacent to the second optical element, wherein the third optical element includes third liquid crystal alignment features formed on a third surface of the third optical element, wherein the third surface faces a fourth surface, opposite the second surface, of the second optical element, wherein the fourth surface has fourth liquid crystal alignment features disposed thereon; and
second liquid crystal material disposed between the third and fourth surfaces of the second and third optical elements,
wherein the second liquid crystal alignment features are aligned with the first liquid crystal alignment features such that each alignment feature included in the second liquid crystal alignment features overlaps with a corresponding adjacent alignment feature included in the first liquid crystal alignment features, and
wherein the first and second liquid crystal alignment features are both oriented orthogonal to the third and fourth liquid crystal alignment features.

14. The ophthalmic device of claim 1, wherein the first and second liquid crystal alignment features induce a preferential alignment of the first liquid crystal material that is obliquely pre-tilted by an angle relative to the first and second surfaces, wherein the angle corresponds to a hydrophobicity of the first and second surfaces.

15. The ophthalmic device of claim 14, wherein the hydrophobicity of the first and second surfaces is at least partially determined via selection of at least one of a pitch of the first or second liquid crystal alignment features, a depth of the first or second liquid crystal alignment features, or a thin film disposed over the first or second liquid crystal alignment features.

16. The ophthalmic device of claim 1, wherein the first optical diffraction grating and the second liquid crystal alignment features are molded into the second surface of the second optical element and both made of a common material as the second optical element.

17. The ophthalmic device of claim 1, wherein the first liquid crystal alignment features are aligned with the second liquid crystal alignment features such that each alignment feature included in the first liquid crystal alignment features overlaps with a corresponding adjacent alignment feature included in the second liquid crystal alignment features.

18. The ophthalmic device of claim 1, wherein the first and second liquid crystal alignment features are structured to cause liquid crystals included in the first liquid crystal material to have a pre-tilt angle orientation of one to five degrees with respect to a normal of the first and second surfaces in an absence of an applied electric potential across the first liquid crystal material.

19. The ophthalmic device of claim 1, wherein the parallel straight lines extending across an inner most concentric ring included in the concentric rings further extend across the concentric rings until reaching an outermost concentric ring included in the concentric rings.

20. An ophthalmic device, comprising:
a first optical element having a first optical diffraction grating and first liquid crystal alignment features disposed on a first surface of the first optical element;
a second optical element having a second optical diffraction grating and second liquid crystal alignment features disposed on a second surface of the second optical element,
wherein the first surface of the first optical element faces the second surface of the second optical element; and
a first liquid crystal material disposed between the first and second surfaces of the first and second optical elements,
wherein the first and second surfaces are first and second curved surfaces, respectively, that are concave or convex shaped such that the first and second optical elements nest into each other, and wherein the first optical diffraction grating is disposed along the first curved surface of the first optical element and the second optical diffraction grating is disposed along the second curved surface of the second optical element,
wherein the second optical diffraction grating is formed from concentric rings of diffraction elements disposed around the second curved surface and wherein the second liquid crystal alignment features form parallel straight lines that cross the concentric rings of the diffraction elements.

21. The ophthalmic device of claim 20, wherein the first and second optical diffraction gratings each comprise concentric rings of diffractive elements and wherein the first and second liquid crystal alignment features are both formed from a plurality of parallel grooves that are straight and extend across the concentric rings of diffractive elements in at least an optical area of the first and second optical elements.

22. The ophthalmic device of claim 21, wherein the plurality of parallel grooves forming the first and second liquid crystal alignment features have a pitch and a depth such that laterally adjacent grooves included in the plurality of parallel grooves are uniformly separated from one another by the pitch and each one of the plurality of parallel grooves has a common height corresponding to the depth, and wherein the plurality of parallel grooves have a square wave cross-sectional shape.

23. The ophthalmic device of claim 22, wherein the pitch ranges from 50 to 1000 nanometers.

24. The ophthalmic device of claim 22, wherein the depth ranges from 20 to 500 nanometers.

25. The ophthalmic device of claim 21, wherein the plurality of grooves forming the first liquid crystal alignment features are aligned with the plurality of grooves forming the second liquid crystal alignment features such that each groove included in the plurality of grooves of the first liquid crystal alignment features overlaps with a corresponding adjacent groove included in the plurality of grooves of the second liquid crystal alignment features.

26. The ophthalmic device of claim 20, wherein the first and second liquid crystal alignment features alter a surface energy of the first and second surfaces, respectively.

27. The ophthalmic device of claim 20, further comprising:
a third optical element having third and fourth surfaces, the third and fourth surfaces forming opposite sides of the third optical element, wherein the third optical element includes:
third liquid crystal alignment features on the third surface, the third liquid crystal alignment features parallel to the first liquid crystal alignment features of the first optical element; and
fourth liquid crystal alignment features on the fourth surface, the fourth liquid crystal alignment features parallel to the second liquid crystal alignment features of the second optical element,
wherein the third liquid crystal alignment features are normal to the fourth crystal alignment features, and
wherein the first liquid crystal alignment features of the first optical element are oriented normal to the second liquid crystal alignment features of the second optical element.

28. The ophthalmic device of claim 27, wherein the third optical element is disposed between the first and second optical elements, wherein the first liquid crystal material is disposed between the first surface of the first optical element and the third surface of the third optical element, and wherein a second liquid crystal material is disposed between the fourth surface of the third optical element and the second surface of the second optical element.

29. The ophthalmic device of claim 20, further comprising:
control circuitry coupled to provide a voltage to first and second conductors disposed on the first and second optical elements, respectively, wherein the first and second conductors are disposed at least in an optical area of the first and second optical elements, respectively.

* * * * *